(12) United States Patent
Hsia et al.

(10) Patent No.: US 8,749,167 B2
(45) Date of Patent: Jun. 10, 2014

(54) LINEAR SOLID-STATE LIGHTING WITH VOLTAGE SENSING MECHANISM FREE OF FIRE AND SHOCK HAZARDS

(75) Inventors: Chungho Hsia, San Jose, CA (US); Pai-Sheng Shen, Bellevue, WA (US)

(73) Assignee: Lightel Technologies, Inc., Renton, WA (US)

( * ) Notice: Subject to any disclaimer, the term of this patent is extended or adjusted under 35 U.S.C. 154(b) by 21 days.

(21) Appl. No.: 13/525,249

(22) Filed: Jun. 15, 2012

(65) Prior Publication Data
US 2013/0335959 A1    Dec. 19, 2013

(51) Int. Cl.
*H05B 37/02*    (2006.01)

(52) U.S. Cl.
USPC ........ 315/291; 315/312; 315/307; 315/209 R; 315/224

(58) Field of Classification Search
USPC ......... 315/119, 185 R, 188, 192, 291, 88–91, 315/121–123, 127, 128, 186, 193, 224–226, 315/294, 297–302, 306–308, 310, 312, 313, 315/320, 323, 361–362; 362/91.5, 91.6
See application file for complete search history.

(56) References Cited

U.S. PATENT DOCUMENTS

| | | | |
|---|---|---|---|
| 6,525,914 B1 | 2/2003 | Legatti | |
| 7,800,316 B2 * | 9/2010 | Haug | 315/299 |
| 7,994,725 B2 * | 8/2011 | Bouchard | 315/122 |
| 8,147,091 B2 | 4/2012 | Hsia et al. | |
| 2010/0045187 A1 | 2/2010 | Shteynberg et al. | |
| 2010/0156324 A1 | 6/2010 | Nagase et al. | |
| 2011/0068703 A1 | 3/2011 | McKinney | |
| 2011/0176297 A1 | 7/2011 | Hsia et al. | |
| 2012/0032610 A1 | 2/2012 | Kang | |
| 2012/0126703 A1 | 5/2012 | Jung et al. | |
| 2012/0139421 A1 | 6/2012 | Lee | |
| 2012/0181952 A1 * | 7/2012 | Roeer | 315/307 |

OTHER PUBLICATIONS

International search report and written opinion issued on Sep. 24, 2012, for the counterpart international application (PCT/US12/46918 filed Jul. 16, 2012).

* cited by examiner

*Primary Examiner* — Thienvu Tran
*Assistant Examiner* — Christopher Lo
(74) *Attorney, Agent, or Firm* — Han IP Corporation

(57) ABSTRACT

A linear light-emitting diode (LED)-based solid-state lamp using a novel voltage sensing and control mechanism operates normally in both single-ended and double-ended luminaire fixtures. The voltage sensing and control mechanisms automatically detect supply source configuration in the fixture and make proper management so that the linear LED lamp works in any fixtures without operational uncertainty or risk of fire. When used with shock protection switches on the two lamp bases at two opposite ends, the universal lamp fully protects a person from possible electric shock during initial installation and re-lamping.

15 Claims, 8 Drawing Sheets

LINEAR SOLID-STATE LIGHTING WITH VOLTAGE SENSING MECHANISM FREE OF FIRE AND SHOCK HAZARDS

BACKGROUND OF THE INVENTION

1. Field of the Invention

This invention relates to linear light-emitting diode (LED) lamps that adopt novel voltage sensing and control mechanisms and thus work with any linear luminaire fixtures configured as single-ended or double-ended, and more particularly to a universal, shock and fire hazard-free linear LED tube lamp with a shock-protection mechanism.

2. Description of the Related Art

Solid-state lighting from semiconductor light-emitting diodes (LEDs) has received much attention in general lighting applications today. Because of its potential for more energy savings, better environmental protection (with no hazardous materials used), higher efficiency, smaller size, and longer lifetime than conventional incandescent bulbs and fluorescent tubes, the LED-based solid-state lighting will be a mainstream for general lighting in the near future. Meanwhile, as LED technologies develop with the drive for energy efficiency and clean technologies worldwide, more families and organizations will adopt LED lighting for their illumination applications. In this trend, the potential safety concerns such as risk of electric shock and fire become especially important and need to be well addressed.

In a retrofit application of a linear LED tube (LLT) lamp to replace an existing fluorescent tube, one must remove the starter or ballast because the LLT lamp does not need a high voltage to ionize the gases inside the gas-filled fluorescent tube before sustaining continuous lighting. LLT lamps operating at the AC mains, such as 110, 220, and 277 VAC, have one construction issue related to product safety and needed to be resolved prior to wide field deployment. This kind of LLT lamps always fails a safety test, which measures through lamp leakage current. Because the line and the neutral of the AC mains apply to both opposite ends of the tube when connected, the measurement of current leakage from one end to the other consistently results in a substantial current flow, which may present a risk of shock during re-lamping. Due to this potential shock risk to the person who replaces LLT lamps in an existing fluorescent tube fixture, Underwriters Laboratories (UL) uses its standard, UL 935, Risk of Shock During Relamping (Through Lamp), to do the current leakage test and to determine if LLT lamps under test meet the consumer safety requirement.

Appliances such as toasters and other appliances with exposed heating filaments present the same kind of hazard. When the line and the neutral wire reverse, the heating filaments can remain live even though the power switches to "off". Another example is screw-in incandescent bulbs. With the line and the neutral wire reversed, the screw-in thread of the socket remains energized. These happen when the line and the neutral wires in the wiring behind the walls or in the hookup of sockets are somehow interchanged even with polarized sockets and plugs that are designed for safety. The reason why a consumer can widely use the appliances with heating filaments and screw-in light lamps without worrying about shock hazard is that they have some kinds of protections. The said appliances have protection grids to prevent consumers from touching the heating filaments even when they are cool. The screw-in light lamp receptacle has its two electrical contacts, the line and the neutral in proximity, recessed in the luminaire. When one screws an incandescent bulb in the receptacle, little shock risk exists.

As mentioned, without protection, shock hazard will occur for an LLT lamp, which is at least 2 feet long; it is very difficult for a person to insert the two opposite bi-pins at the two ends of the LLT lamp into the two opposite sockets at two sides of the luminaire fixture at the same time. Because protecting consumers from possible electric shock during re-lamping is a high priority for LLT lamp manufacturers, they need to provide a basic protection design strictly meeting the minimum leakage current requirement and to prevent any possible electric shock that users may encounter in actual usage, no matter how they instruct a consumer to install an LLT lamp in their installation instructions.

Referring to FIGS. 1 and 2, a conventional LLT lamp 100 comprises a housing 110 with a length much greater than its diameter of 25 to 32 mm, two end caps 120 and 130 with bi-pins 180 and 190 respectively on two opposite ends of the housing 110, LED arrays 140 mounted on a printed circuit board (PCB) 150, and an LED driver 160 used to receive energy from the AC mains through electrical contacts 142 and the bi-pins 180 and 190, to generate a proper DC voltage with a proper current, and to supply it to the LED arrays 140 such that the LEDs 170 on the PCB 150 can emit light. The bi-pins 180 and 190 on the two end caps 120 and 130 connect electrically to the AC mains, either 110 V, 220 V, or 277 VAC, through two electrical sockets located lengthways in an existing fluorescent tube fixture whereas the two sockets in the fixture connect electrically to the line and the neutral wire of the AC mains, respectively. This is a so called "double-ended" configuration.

To replace a fluorescent tube with an LLT lamp 100, one inserts the bi-pin 180 at one end of the LLT lamp 100 into one of the two electrical sockets in the fixture and then inserts the other bi-pin 190 at the other end of the LLT lamp 100 into the other electrical socket in the fixture. When the line power of the AC mains applies to the bi-pin 180 through one socket, and the other bi-pin 190 at the other end has not yet been in the other socket in the fixture, the LLT lamp 100 and the LED driver 160 are deactivated because no current flows through the LED driver 160 to the neutral. However, the internal electronic circuitry is live. At this time, if the person who replaces the LLT lamp 100 touches the exposed bi-pin 190, which is energized, he or she will get electric shock because the current flows to earth through his or her body—a shock hazard.

Almost all the LLT lamps currently available on the market are without any protections for such electric shock. The probability of getting shock is 50%, depending on whether the person who replaces the lamp inserts the bi-pin first to the line of the AC mains or not. If he or she inserts the bi-pin 180 or 190 first to the neutral of the AC mains, then the LLT lamp 100 is deactivated while the internal circuitry is not live—no shock hazard. An LLT lamp supplier may want to adopt single protection only at one end of an LLT lamp in an attempt to reduce the risk of shock during re-lamping. However, such a single protection approach cannot completely eliminate the possibility of shock risk. As long as shock risk exists, the consumer product safety remains the most important issue.

An easy solution to reducing the risk of shock is to connect electrically only one of two bi-pins at the two ends of an LLT lamp to the AC mains, leaving the other dummy bi-pin at the other end of the LLT lamp insulated, so called "single-ended". In such a way, the line and the neutral of the AC mains go into the LLT lamp through the single-ended bi-pin, one for "line" (denoted as L, hereafter) and the other for "neutral" (denoted as N, hereafter). The electrically insulated dummy bi-pin at the other end only serves as a lamp holder to support LLT lamp mechanically in the fixture. In this case, however, the retrofit and rewiring of the existing fixture to enable such LLT lamp may involve two new electrical sockets replacement in the fixture and needs much longer time to complete the rewiring because conventional fluorescent tube is double-ended, and its fixture and lamp holder sockets are wired in a double-ended manner. The new sockets, rewiring, and installation costs together will be too high for consumers to replace conventional fluorescent tubes economically. Therefore, some manufacturers have modified the dummy bi-pin by internally connecting the two pins with a conductor. The purpose is to convert a double-ended fixture/wiring into a single-ended configuration so that the single-ended LLT lamp can be used in the double-ended fixture/wiring as shown in FIG. 3, no matter whether the active end of the LLT lamp is on the left or right hand side in the fixture.

In FIG. 3, the AC mains supply voltage to the bi-pin sockets in the lamp holder 311 and 312 from two opposite ends of the LLT lamp 101—a double-ended configuration. However, LLT lamp 101 is internally connected as single ended because two pins 181 and 182 of the bi-pin are at one end, from which the driver 400 receives energy to power LED arrays 214. The conductors 255 in the sockets of the lamp holder 311 and 312 are used to connect the bi-pins to the AC mains through electrical contacts shown as dots. The "dot" notation will be used to indicate electrical contacts throughout the figures. In order to receive energy from both ends of a double-ended fixture so that such a single-ended LLT lamp can operate in the double-ended fixture, manufacturers interconnect the two pins 183 and 184 of the bi-pin at one end with a conductor 251 inside the lamp such that electric current can flow through the pin 183, the conductor 251, the pin 184, and an electrical wire 252 to the pin 182 at the other end. The modification seems to work to operate the LLT lamp in the double-ended fixture and be able to pass UL leakage current test. But this introduces shock and fire hazards. Imagine what will happen if consumers insert this electrically shorted end to a real single-ended fixture that has L and N connections on the bi-pin socket. This definitely will burn the connections on the bi-pin, possibly causing fire, and trip the circuit breaker. Due to this potential shock and fire risk for this kind of LLT lamp modification used with an existing fluorescent tube fixture, UL requires that the lamp base bi-pin used for mechanical support only not be interconnected or connected to dead metal parts of the lamp base. Furthermore, such single-ended LLT lamps are subjected to the requirements in UL Isolation of Lamp Pins test, ensuring no indication of fire or risk of electric shock if manufacturers want their products to be UL certified.

Similar hazards occur for double-ended lamps. There are many double-ended lamps without shock-protection mechanisms on the linear LED lighting market. Such lamps will never pass UL leakage current test and present the shock risk during re-lamping, as mentioned above. In addition, such non-UL compliant LLT lamps have their bi-pins internally connected. In FIG. 4, the driver 400 receives energy from both bi-pin sockets in the lamp holders 313 and 314 at opposite ends of the LLT lamp 102 to power LED arrays 214—a double-ended configuration. The two pins 181 and 182 at one end are internally interconnected with a conductor 253. Similarly, the two pins 183 and 184 at the other end are internally interconnected with a conductor 254. In this case, as long as either one electrical contact in the bi-pin sockets has a power, the LLT lamps can operate. Manufacturers do this modification just trying to make it easy for consumers to more easily retrofit their linear luminaire fixtures without considering that the same hazards as mentioned for the single-ended LLT lamps may occur if either one of such bi-pins is inserted into a powered socket in a single-ended fixture with single-ended wiring. Furthermore, because LLT lamps have a very long service life, consumers who do not know single-ended and double-ended configurations may try to install their LLT lamps in another fixture with unknown wiring configuration several years later while original installation/wiring instructions may not be found. In this case, there exist fire and shock hazards.

In the U.S. Pat. No. 8,147,091, issued Apr. 3, 2012, double shock protection switches are used in a double-ended LLT lamp to isolate its LED driver such that a leakage current flowing from a live bi-pin, through the LED driver, to an exposed bi-pin is eliminated without hazards. FIGS. 5 and 6 illustrate an LLT lamp with such shock protection switches. The LLT lamp 200 has a housing 201; two lamp bases 260 and 360, one at each end of the housing 201; two actuation mechanisms 240 and 340 of shock protection switches 210 and 310 in the two lamp bases 260 and 360, respectively; an LED driver 400; and LED arrays 214 on an LED PCB 205.

FIG. 6 is a block diagram of an LLT lamp 200 with the protection switches 210 and 310. The shock protection switch 210 comprises two electrical contacts 220 and 221 and one actuation mechanism 240. Similarly, a shock protection switch 310 comprises two electrical contacts 320 and 321 and one actuation mechanism 340. The electrical contact 220 in the protection switch 210 connects electrically to the bi-pin 250 that connects to the L wire of the AC mains, and the other contact 221 connects to one of the inputs 270 of the LED driver 400. Similarly, the electrical contact 320 in the protection switch 310 connects electrically to the bi-pin 350 that connects to the N wire of the AC mains, and the other contact 321 connects to the other input 370 of the LED driver 400. The switch is normally off. Only after actuated, will the switches turn "on" such that they connect the AC mains to the LED driver 400 that in turn powers the LED arrays 214. Served as gate controllers between the AC mains and the LED driver 400, the protection switches 210 and 310 connect the line and the neutral of the AC mains to the two inputs 270 and 370 of the driver 400, respectively. If only one shock protection switch 210 is used at one lamp base 260, and if the bi-pin 250 of this end happens to be first inserted into the live socket at one end of the fixture, then a shock hazard occurs because the shock protection switch 210 already allows the AC power to electrically connect to the driver 400 inside the LLT lamp when the bi-pin 250 is in the socket. Although the LLT lamp 200 is deactivated at the time, the LED driver 400 is live. Without the shock protection switch 310 at the other end of the LLT lamp 200, the driver input 370 connects directly to the bi-pin 350 at the other end of the LLT lamp 200. This presents a shock hazard. However, if the shock protection switch 310 is used in accordance with this application, the current flow to the earth continues to be interrupted until the bi-pin 350 is inserted into the other socket, and the protection switch 310 is actuated. The switch redundancy eliminates the possibility of shock hazard for a person who installs an LLT lamp in the existing fluorescent tube fixture.

Double shock protection switches used in a double-ended LLT lamp can be used to isolate its LED driver such that a leakage current flowing from a live bi-pin, through the driver, to an exposed bi-pin is eliminated without hazards. However, such lamps are non-operable because no power supplies to the driver when used with single-ended fixtures. Even worse, when the two adjacent pins of the bi-pin on either one of the two ends in the double-ended LLT lamp are abnormally interconnected, the lamps may present fire hazard as mentioned above. In the present invention, however, double shock protection switches are used in a universal single-ended or double-ended LLT lamp to isolate its voltage sensing mechanism such that the leakage current flowing from a live bi-pin, through the voltage sensing mechanism, to an exposed bi-pin is interrupted without hazards.

SUMMARY OF THE INVENTION

A linear light-emitting diode (LED)-based solid-state device comprising a housing served as a heat sink, an LED driver, an LED printed circuit board (PCB) with a plurality of LEDs as LED arrays, a lens, a novel voltage sensing mechanism, and a control mechanism, is used to replace a fluorescent tube in a retrofit or newly-made luminaire fixture that could be single-ended or double-ended. The novel voltage sensing and control mechanisms in such an LLT lamp can detect supply source configuration in the fixture and make proper and necessary management so that the LLT lamp can operate with either single-ended or double-ended wiring fixtures without operational uncertainty or risk of fire. Such mechanisms when used with shock protection switches on both ends of the LLT lamp can buffer the line and neutral of the AC mains to electrically connect to two inputs of the LED driver used to power LED arrays. Therefore, no line voltage or leakage current will possibly appear at or flow through the exposed bi-pin during initial installation or re-lamping, thus completely eliminating risk of fire and electric shocks.

DETAILED DESCRIPTION OF THE INVENTION

Misapplications of power supply connections for LLT lamps that substitute for linear fluorescent lamps are the main causes of fire and electric shock hazards today, where the LLT lamps are incorrectly connected to a supply source, the lamp base is either inserted incorrectly into a lamp holder or inserted into a lamp holder not intended for the lamp, or a lamp is connected to lamp holders with supply connections that do not match the lamp configuration. All of these misapplications may result in fire and shock hazards.

To completely remove these hazards from LLT lamps, manufacturers need to ensure at first no electrically shorted ends in either single-ended or double-ended LLT lamps. For double-ended LLT lamps, double protection switches on both ends of the LLT lamps must be used without compromise. For single-ended LLT lamps, consumers may find them difficult to use because there is a chance that the LLT lamps cannot be lighted up after installation due to the fact that the lamp may be connected to a lamp holder that does not have supply connections. In this case, the consumers need to uninstall the lamp and reinstall it with the end exchanged to see if the lamp is operational. Whereas a linear luminaire fixture may be wired single- or double-ended, a linear lamp may be configured internally in the similar fashion. However, any incompatible combinations of the lamps and the fixtures lead to failure of operation. These kinds of operational uncertainty, inconvenience, and possible hazards may severely affect the willingness of the consumers to adopt LLT lamps.

For consumer safety and convenience, it is believed that a universal LLT is needed to operate without operational uncertainty and hazards when installed in either single-ended or double-ended linear luminaire fixtures during initial installation for a retrofit luminaire conversion or during lamp replacement when the above-mentioned misapplications may occur. From a manufacturer's perspective, a universal LLT lamp is essential not only in protecting consumers but also in helping simplify manufacturing processes and inventories.

In the present invention, a voltage sensing mechanism, a control mechanism, and double shock protection switches are incorporated into a universal LLT lamp that can work with single-ended or double-ended linear luminaire fixtures. Moreover, because leakage current flowing from a live bi-pin, through the voltage sensing mechanism, to an exposed bi-pin is interrupted by the double shock protection switches, the universal LLT lamp is fire and shock hazard-free. This is different from the lamp adopted in the U.S. Pat. No. 8,147,091, which can only be used in double-ended fixtures. However, the lamp used in the present invention has a similar appearance even on switch actuation mechanisms that protrude the end caps, although the switches used inside the lamp are different.

Figure 1:
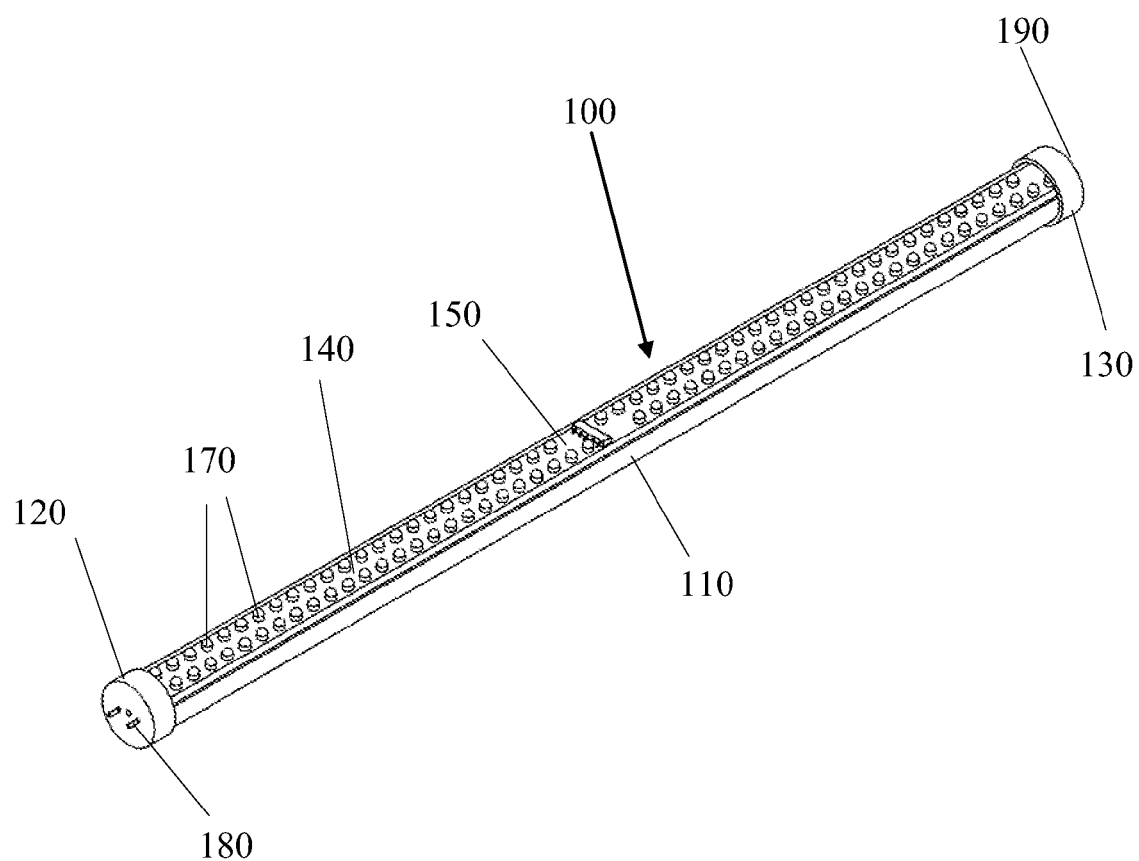
FIG. 1 is an illustration of a conventional LLT lamp.
Figure 2:
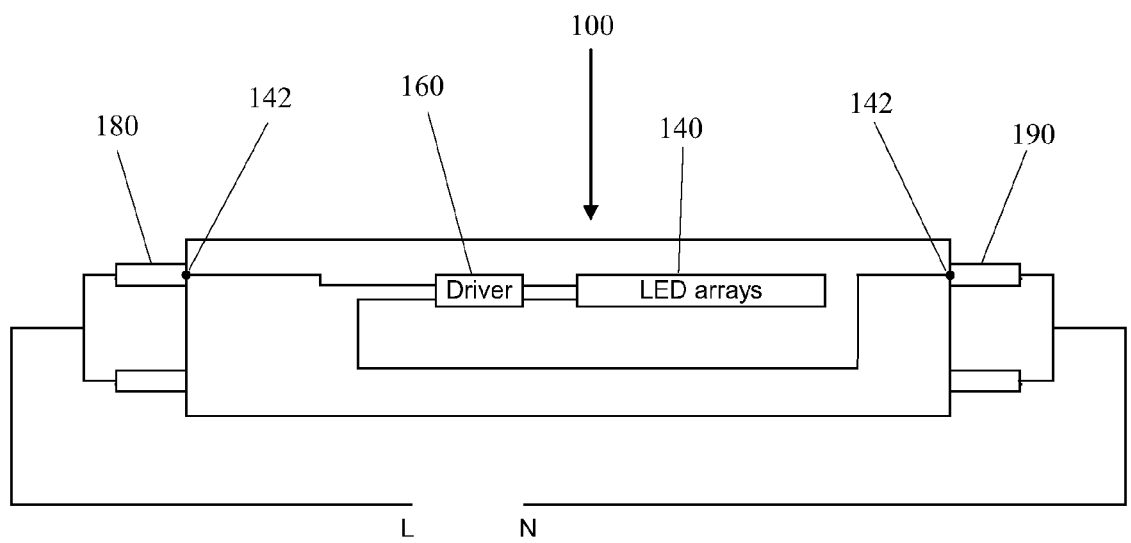
FIG. 2 is a block diagram of a conventional LLT lamp.
Figure 3:
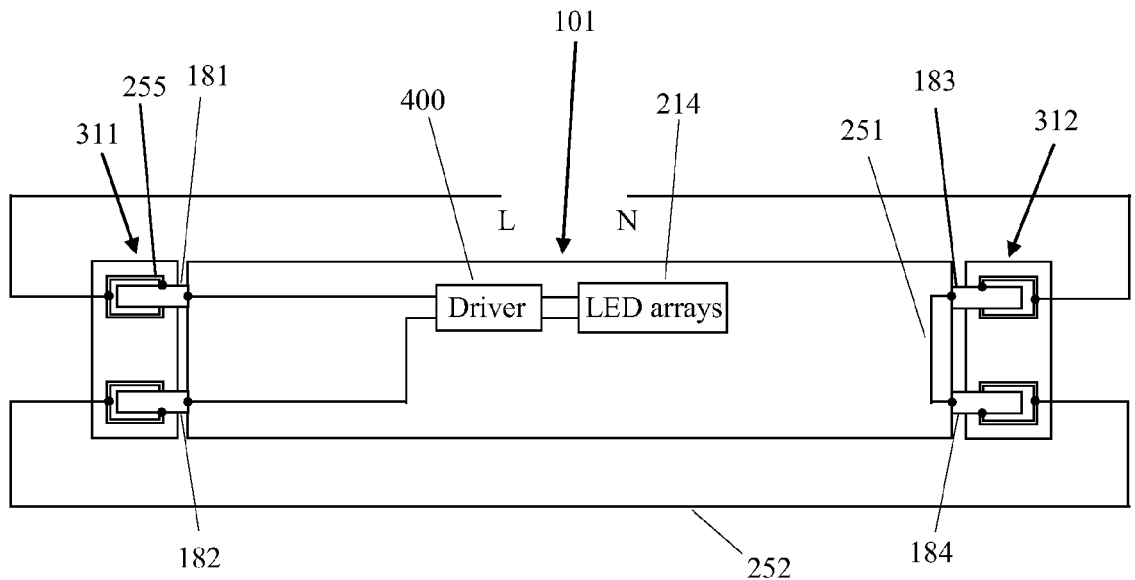
FIG. 3 is an illustration of a single-ended LLT lamp with an electrically shorted end, installed in a double-ended fixture lamp holder.
Figure 4:
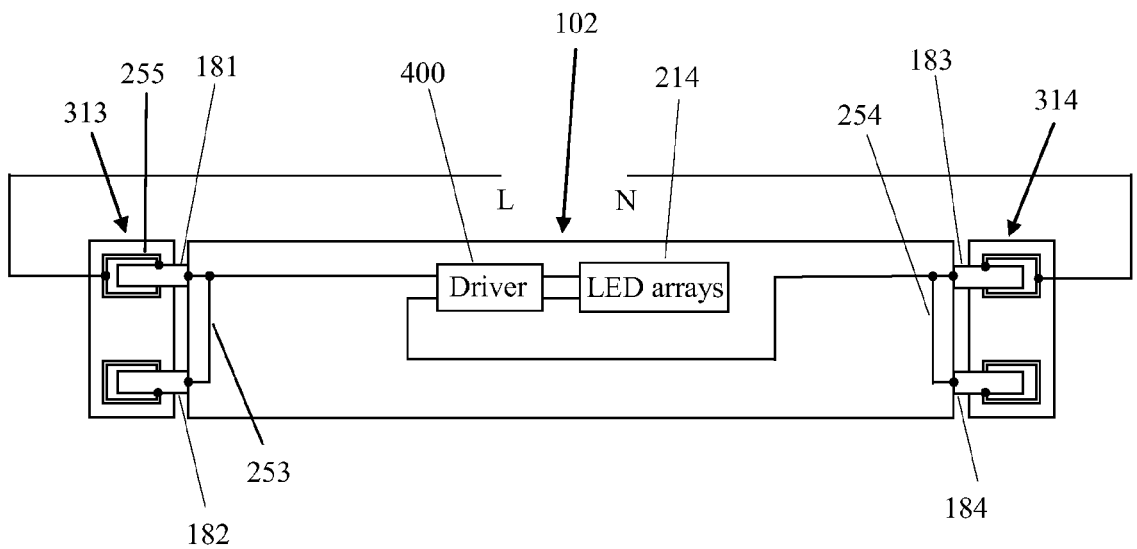
FIG. 4 is an illustration of a double-ended LLT lamp with two electrically shorted ends, installed in a double-ended fixture lamp holder.
Figure 5:
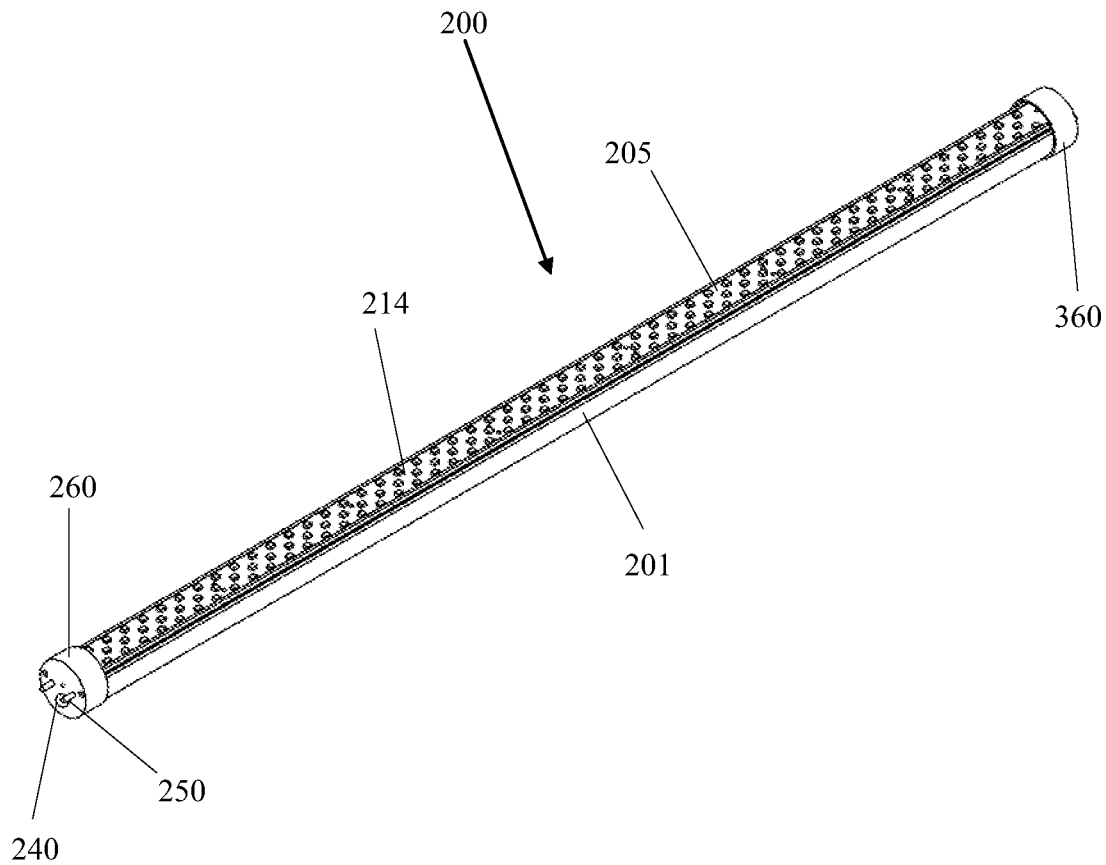
FIG. 5 is an illustration of an LLT lamp with shock protection switches.
Figure 6:
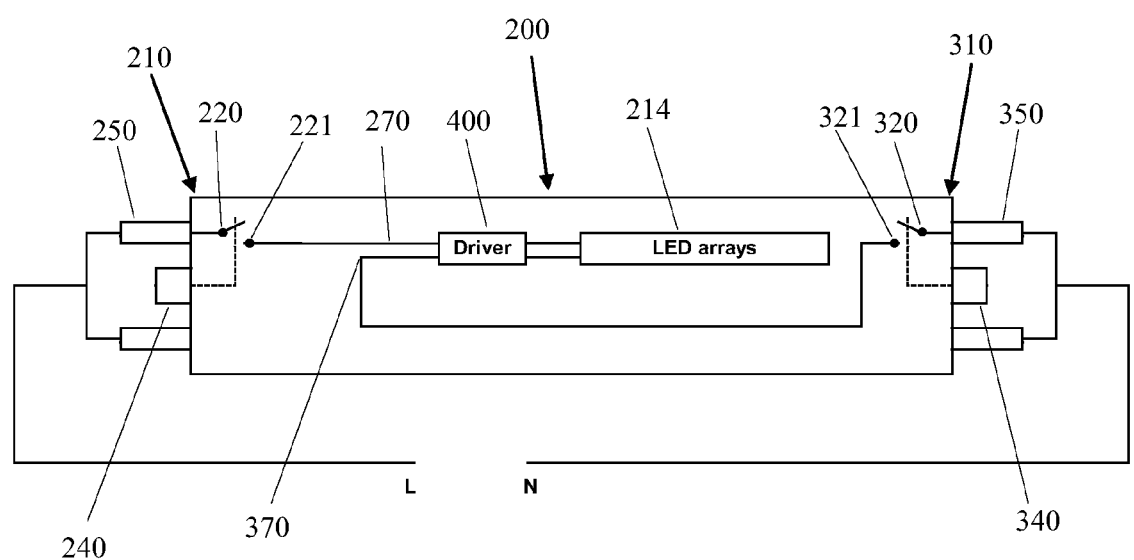
FIG. 6 is a block diagram of an LLT lamp with shock protection switches.
Figure 7:
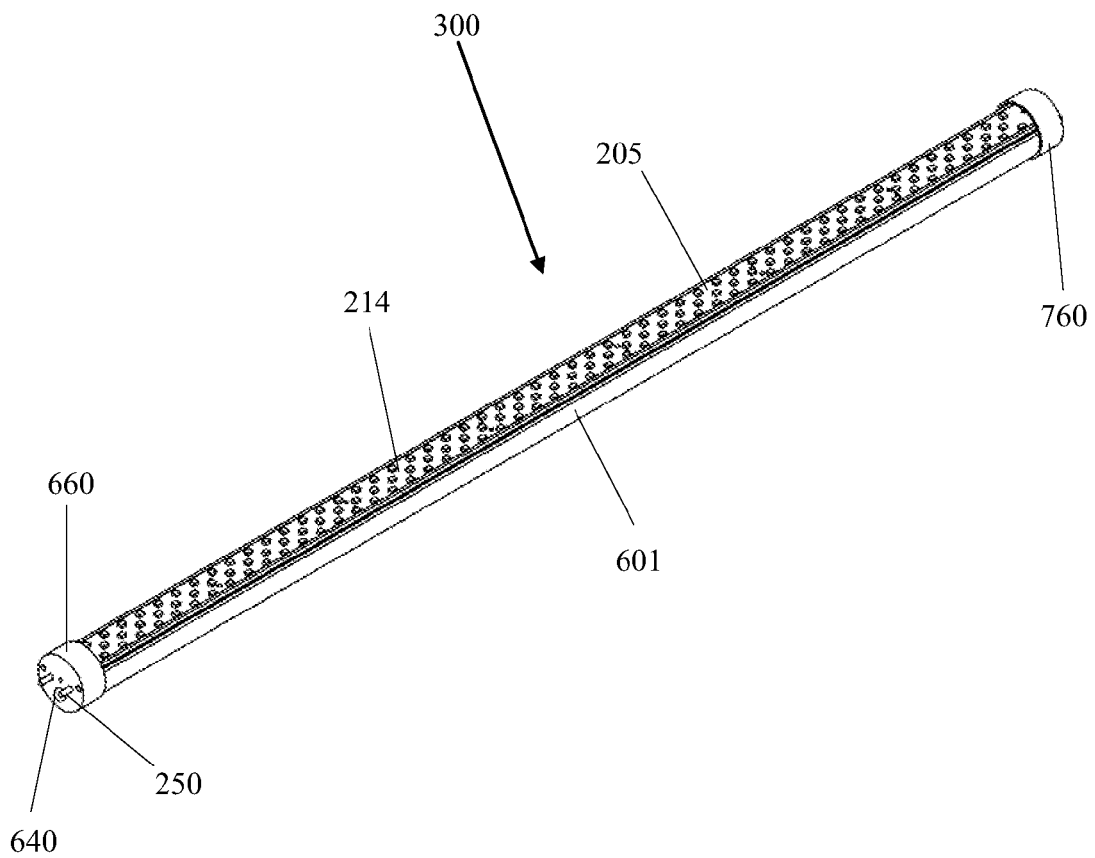
FIG. 7 is an illustration of an LLT lamp adopting shock protection switches and voltage sensing and control mechanisms inside the lamp according to the present invention.
Figure 8:
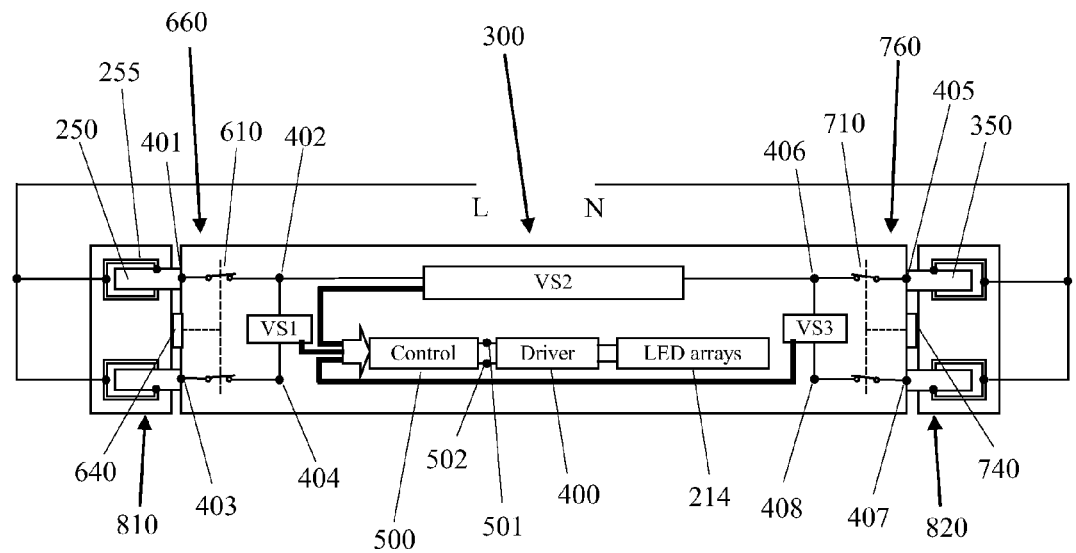
FIG. 8 is a block diagram of an LLT lamp according to the present invention, in which the lamp is installed in a double-ended fixture lamp holder.
Figure 9:
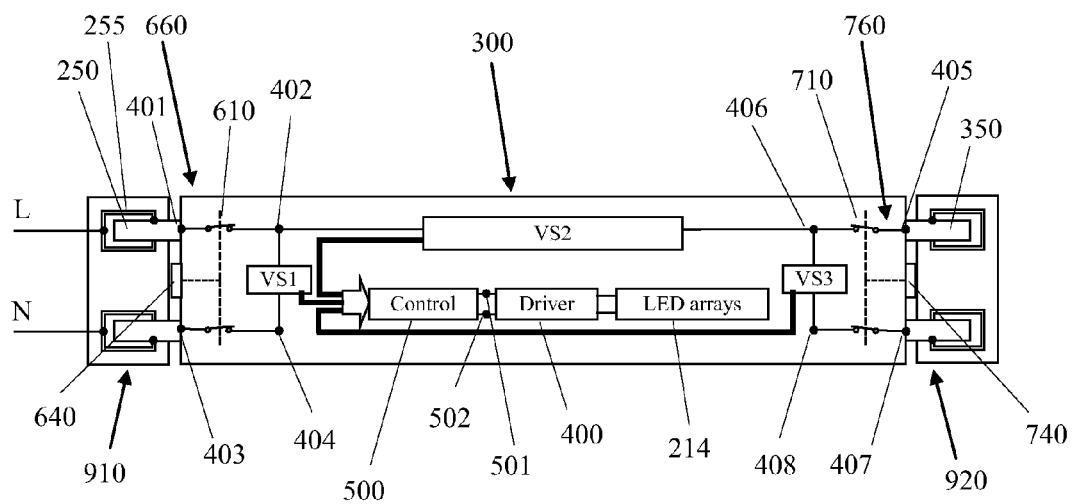
FIG. 9 is a block diagram of an LLT lamp according to the present invention, in which the lamp is installed in a single-ended fixture lamp holder.

FIGS. 7-9 illustrate an LLT lamp according to the present invention. The universal LLT lamp 300 has a housing 601; two lamp bases 660 and 760, one at each end of the housing 601; two actuation mechanisms 640 and 740 of shock protection switches 610 and 710 in the two lamp bases 660 and 760, respectively; a voltage sensing mechanism (VS1, VS2, and VS3); a control mechanism 500; an LED driver 400; and LED arrays 214 on an LED PCB 205.

FIG. 8 is a block diagram of an LLT lamp according to the present invention, in which the lamp is installed in a double-ended fixture lamp holder. The lamp bases 660 and 760 respectively use the bi-pins 250 and 350 to connect the AC mains to the LED driver 400 through the protection switch 610 and 710 normally in "off" state, the voltage sensing mechanism (VS1, VS2, and VS3), and the control mechanism 500. When actuated (pressed in, twisted on, etc.), the actuation mechanisms 640 and 740 respectively actuate the protection switches 610 and 710 and turn on the connection between the AC mains and the voltage sensing mechanism that comprises three voltage sensing devices, VS1, VS2, and VS3, wherein VS1 and VS3 are two end voltage sensing devices and VS2 is a middle voltage sensing device. The thick lines in FIG. 8 represent L and N wires and a control signal path, same in FIG. 9. When each of the voltage sensing devices VS1, VS2, and VS3 detects a predetermined threshold voltage existed between its two inputs, it will send a control signal to the control mechanism 500 which in turn connects the AC mains from one of the voltage sensing devices, VS1, VS2, and VS3, which detects the predetermined threshold voltage, to the LED driver 400. In FIG. 8, the fixture lamp holder sockets are connected as double-ended configuration. The protection switch 610 at the lamp base 660 is of double-pole single-throw type, which consists of one actuation mechanism 640 and two sets of electrical contacts, (401, 402) and (403, 404), with the electrical contacts 401 and 403 connecting individually to the two pins of the bi-pin 250. Similarly, the shock protection switch 710 at the other lamp base 760 comprises one actuation mechanism 740 and two sets of electrical contacts, (405, 406) and (407, 408), with the electrical contacts 405 and 407 connecting individually to the two pins of the bi-pin 350. The three voltage sensing devices, VS1, VS2, and VS3, are used in between electrical contacts, 402 and 404, 402 and 406, and 406 and 408, respectively.

When someone tries to install the universal lamp 300 in a double-ended fixture as in FIG. 8, he or she needs to first insert, for example, the lamp base 660 to the fixture lamp holder 810. The actuation mechanism 640 is actuated to turn on both sets of electrical contacts on the shock protection switch 610. The voltage sensing device VS1 senses whether a voltage exists between its two inputs, the electrical contacts 402 and 404. Because the fixture lamp holder sockets are connected in a double-ended manner, the electrical contacts 402 and 404 have the same electrical potential, and no control signal is sent to the control mechanism 500, and thus no power is delivered to LED. At this time, because the lamp base 760 has not yet been inserted into the lamp holder 820, the actuation mechanism 740 is not actuated. So the shock protection switch 710 remains "off", disconnecting internal electricity to the exposed bi-pin 350, and thus no leakage current can possibly flow—no shock hazard. When the person who does the installation further inserts the lamp base 760 into the lamp holder 820, the actuation mechanism 740 is actuated, which turns on the protection switch 710 that in turn connects the bi-pin 350 to the electrical contacts 406 and 408. Again, because the fixture lamp holder sockets are connected in a double-ended manner, the voltage sensing device VS3 senses no voltage between its two inputs, the electrical contacts 406 and 408, and sends no control signal to the control mechanism 500. However, when the protection switch 710 is "on", the voltage sensing device VS2 becomes live, which can sense whether a voltage exists between its two inputs, the electrical contacts 402 and 406. In this case, the voltage sensing device VS2 senses a predetermined threshold voltage between the electrical contacts 402 and 406, and then sends a control signal to the control mechanism 500 which turns on the AC mains connection and in turn powers the driver 400 through the electrical contacts 501 and 502 and lights up the LED arrays 214.

FIG. 9 is a block diagram of an LLT lamp according to the present invention, in which the lamp is installed in a single-ended fixture sockets. When someone tries to install the universal lamp 300 in the single-ended fixture, he or she first inserts, for example, the lamp base 660 to the fixture lamp holder 910. As mentioned, the actuation mechanism 640 is actuated to turn on both sets of electrical contacts on the shock protection switch 610. The voltage sensing device VS1 senses whether a voltage exists between the electrical contacts 402 and 404 that it connects. If the sockets of the fixture lamp holder 910 are connected to the AC mains, the voltage sensing device VS1 senses that a predetermined threshold voltage exists between the electrical contacts 402 and 404, and sends a control signal to the control mechanism 500, which turns on the AC mains connection and in turn powers the driver 400 through the electrical contacts 501 and 502 and lights up the LED arrays 214. On the other hand, if the sockets of the fixture lamp holder 920 rather than the lamp holder 910 are connected to the AC mains, no voltage exists between the electrical contacts 402 and 404, and thus no control signal is sent to the control mechanism 500. When the person who does the installation further inserts the lamp base 760 into the lamp holder 920, the actuation mechanism 740 is actuated, which turns on the protection switch 710 that in turn connects the bi-pin 350 to the electrical contacts 406 and 408. Thus, the voltage sensing device VS3 senses the predetermined threshold voltage between the electrical contacts 406 and 408, and sends a control signal to the control mechanism 500, which turns on the AC mains connection and in turn powers the driver 400 through the electrical contacts 501 and 502 and lights up the LED arrays 214. At the same time, when the protection switch 710 is "on", the voltage sensing device VS2 senses no voltage between the electrical contacts 402 and 406, and sends no control signal to the control mechanism 500, as expected. Therefore, the voltage sensing mechanism, the control mechanism, and the shock protection mechanism adopted in this universal LLT lamp can work with either single-ended or double-ended fixtures free of operational uncertainty and fire and shock hazards.

For illustration purpose, shock protection switches 610 and 710 are both of contact type, which can be a snap switch, a push-button switch, a micro switch, or a rotary switch. In reality, the shock protection switch can be of a non-contact type, such as electro-mechanical, electromagnetic, optical, electro-optic, fiber-optic, infrared, or wireless based. Furthermore, the non-contact shock protection switch can be of a sensing type, having a proximity control or sensing range up to 8 mm.

Figure 10:
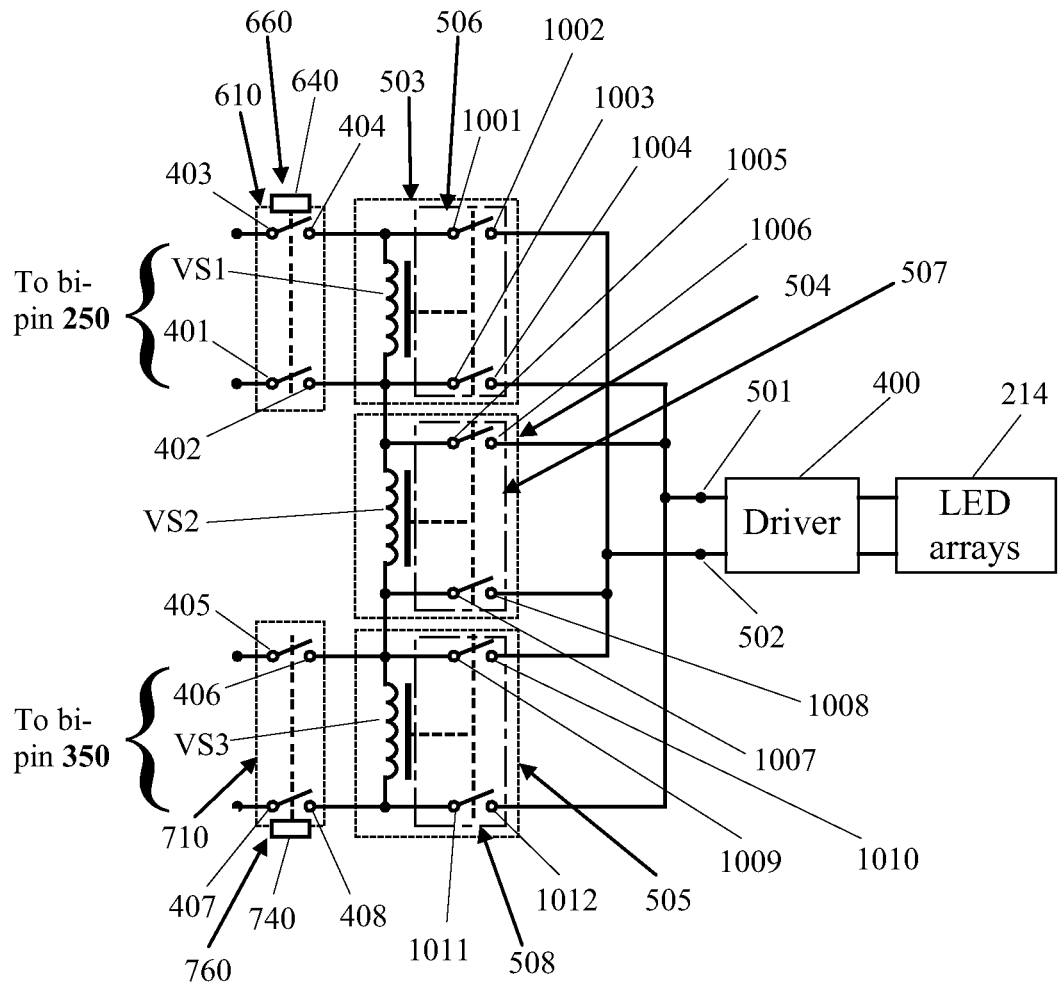
FIG. 10 is a preferred embodiment of a voltage sensing mechanism and a control mechanism with shock protection switches used in the present invention.

FIG. 10 depicts a preferred embodiment of a voltage sensing mechanism and a control mechanism with shock protection switches according to the present invention. Essentially the voltage sensing mechanism (VS1, VS2 and VS3) and the control mechanism 500 (in FIG. 8 and FIG. 9) are embodied in three relays 503, 504, and 505. Each of the relays comprises a coil of wire as a voltage sensing device and a switch. The control mechanism 500 corresponds to the three switches 506, 507, and 508, respectively actuated by the sensing devices VS1, VS2 and VS3. In FIG. 10, the relay 503 comprises a coil of wire as the voltage sensing device VS1 and the switch 506 that has two sets of electrical contacts (1001, 1002) and (1003, 1004)—a double pole single-throw type. The coil of wire is wrapped around a soft iron core wherein when a predetermined threshold voltage applies on the coil or a proper electric current passes through it, the coil generates a magnetic field that activates the switch 506 by actuating a mechanism that turn on the electrical contacts 1001 and 1002, and 1003 and 1004, respectively. Similarly, the relay 504 comprises a coil of wire as the voltage sensing device VS2 and the switch 507 that has two sets of electrical contacts (1005, 1006) and (1007, 1008). The relay 505 comprises a coil of wire as the voltage sensing device VS3 and the switch 508 that has two sets of electrical contacts (1009, 1010) and (1011, 1012). For each of relays 503, 504 and 505, one electrical contact of each set of the electrical contacts connects to one of the two inputs of the respective coil and the other electrical contact connects to one of the inputs 501 and 502 of the LED driver 400.

The three voltage sensing devices VS1, VS2, and VS3 connected in series are respectively connected to the electrical contacts, 404 and 402, 402 and 406, and 406 and 408, in which the electrical contacts 404 and 402, and 406 and 408 are parts of the shock protection switches 610 and 710, respectively. When the actuation mechanism 640 on the shock protection switch 610 is actuated, the electrical contacts 403 and 401 are respectively connected to the electrical contacts 404 and 402. Similarly, when the actuation mechanism 740 on the shock protection switch 710 is actuated, the electrical contacts 405 and 407 are respectively connected to electrical contacts 406 and 408. Both the shock protection switches 610 and 710 are needed to prevent the leakage current to flow. For example, if the lamp base 760 does not have the shock protection switch 710, then the leakage current can flow from the electrical contact 401 and 402 through VS2 and VS3 to electrical contacts 405 and 407, which connect to the exposed bi-pin 350 if the electrical contact 401 is connected to L of the AC mains, and the lamp base 760 has not yet been inserted into the fixture lamp holder.

When both lamp bases 660 and 760 (in FIGS. 8 and 9) are inserted into the fixture lamp holder sockets 810 and 820 (in FIG. 8) or 910 and 920 (in FIG. 9), all the voltage sensing devices VS1, VS2, and VS3 operate, but one and only one of them detects a voltage between its two inputs. A predetermined threshold voltage applying on a coil (503, 504, or 505) will generate a magnetic field strong enough to actuate the switch in the relay to connect the associated electrical contacts. On the other hand, if a voltage less than the predetermined threshold voltage applies on the coil, the magnetic field generated will be too weak to actuate the switch in the relay to connect the associated electrical contacts. When the voltage sensing device VS1 detects the predetermined threshold voltage from the AC mains, the relay 503 functions such that the two sets of electrical contacts (1001, 1002) and (1003, 1004) are electrically connected respectively. Thus, the AC mains are connected to the LED driver 400, which in turn powers up the LED arrays 214. Similarly for VS2 and VS3, when they detect the predetermined threshold voltage from the AC mains, the relays 504 and 505 function such that their associated sets of electrical contacts (1005, 1006) and (1007, 1008), (1009, 1010) and (1011, 1012) are connected respectively. The switches 506, 507, and 508 in the relays 503, 504, and 505 constitute the control mechanism which connects the AC mains from one of three voltage sensing devices VS1, VS2, and VS3 to the LED driver 400 to power up the LED arrays 214. This embodiment has the advantages of being simple and also passive without pre-power to operate. Thus, it is easy to implement.

Although the above embodiment uses electromagnetic relays to implement both the voltage sensing mechanism and the control mechanism, they can be of solid-state type, without moving parts to perform switch function controlled by a control signal. The voltage sensing mechanism and the control mechanism can be of a non-relay type, implemented by an application-specific integrated circuit (ASIC), a field-programmable gate array (FPGA), or a microprocessor.

What is claimed is:

1. A linear light-emitting diode (LED) tube lamp, comprising:
    a housing having two ends;
    a light-emitting diode printed circuit board (LED PCB), the LED PCB having LED arrays fixed thereon;
    an LED driver that powers the LED arrays on the LED PCB, the LED driver having two inputs;
    a voltage sensing mechanism, comprising two end voltage sensing devices and a middle voltage sensing device connected between the two end voltage sensing devices;
    a control mechanism, receiving and coupling voltage outputs from the two end voltage sensing devices and the middle voltage sensing device and electrically connecting to the two inputs of the driver; and
    two lamp bases respectively connected to the two ends of the housing, each lamp base having a bi-pin with two pins protruding outwards, and a shock protection switch, wherein the shock protection switch of each of the lamp bases comprises:
        two sets of electrical contacts, each set having at least two electrical contacts, one electrically connected to one of the two pins of the bi-pin and another electrically connected to one of the two inputs of the associated end voltage sensing device; and
        at least one switch actuation mechanism having a front portion protruding outwards,
    wherein when the front portion of the switch actuation mechanism is pressed in or twisted on by inserting the bi-pin of the lamp base into a lamp socket, the electrical contacts of each of the two sets of electrical contacts are electrically connected to actuate the shock protection switch;
    wherein when the shock protection switch is off, the bi-pin is not electrically connected with any one of the voltage sensing devices; and
    wherein when the bi-pin is inserted into a lamp socket, the shock protection switch is actuated to electrically connect the two pins of the bi-pin respectively with two inputs of one of the end voltage sensing devices.

2. The linear LED tube lamp of claim 1, wherein each of the three voltage sensing devices comprises a coil of wire, and the control mechanism comprises three switches, each switch including two sets of electrical contacts, each set having two electrical contacts, wherein the three coils of wire and the three switches are paired to form three relays respectively,
    wherein one electrical contact of each set of electrical contacts connects to one of the two inputs of the coil of wire and the other electrical contact connects to one of the inputs of the LED driver; and wherein when a predetermined threshold voltage applies on the coil of wire, the switch is actuated to electrically connect the two electrical contacts in each set of electrical contacts.

3. The linear LED tube lamp of claim 1, wherein the voltage sensing mechanism and the control mechanism are of a non-relay type, implemented by an application-specific integrated circuit (ASIC), a field-programmable gate array (FPGA), or a microprocessor.

4. The linear LED tube lamp of claim 1, wherein the voltage sensing mechanism and the control mechanism are of a non-electromagnetic relay type.

5. The linear LED tube lamp of claim 4, wherein the voltage sensing mechanism and the control mechanism are of a solid-state relay type.

6. The linear LED tube lamp of claim 1, wherein each of the shock protection switches is of a contact type.

7. The linear LED tube lamp of claim 1, wherein each of the shock protection switches is a snap switch, a push-button switch, a micro switch, or a rotary switch.

8. The linear LED tube lamp of claim 1, wherein each of the shock protection switches is of a non-contact type.

9. The linear LED tube lamp of claim 8, wherein each of the shock protection switches is electro-mechanical, electromagnetic, optical, electro-optic, fiber-optic, infrared, or wireless based.

10. The linear LED tube lamp of claim 9, wherein each of the shock protection switches is of a sensing type, having a proximity control or sensing range up to 8 mm.

11. A linear light-emitting diode (LED) tube lamp, comprising:
    a housing having two ends;
    a light-emitting diode printed circuit board (LED PCB), the LED PCB having LED arrays fixed thereon;

an LED driver that powers the LED arrays on the LED PCB, the LED driver having two inputs;

a voltage sensing mechanism, comprising two end voltage sensing devices and a middle voltage sensing device connected between the two end voltage sensing devices;

a control mechanism, receiving and coupling voltage outputs from the two end voltage sensing devices and the middle voltage sensing device and electrically connecting to the two inputs of the driver; and two lamp bases respectively connected to the two ends of the housing, each lamp base having a bi-pin with two pins protruding outwards, the two pins of the bi-pin electrically connected respectively with two inputs of one of the end voltage sensing devices, wherein each of the three voltage sensing devices comprises a coil of wire, and the control mechanism comprises three switches, each switch including two sets of electrical contacts, each set having two electrical contacts, wherein the three coils of wire and the three switches are paired to form three relays respectively;

wherein one electrical contact of each set of electrical contacts connects to one of the two inputs of the coil of wire and the other electrical contact connects to one of the inputs of the LED driver; and wherein when a predetermined threshold voltage applies on the coil of wire, the switch is actuated to electrically connect the two electrical contacts in each set of electrical contacts.

12. The linear LED tube lamp of claim 11, wherein the voltage sensing mechanism and the control mechanism are of a non-relay type, implemented by an application-specific integrated circuit (ASIC), a field-programmable gate array (FPGA), or a microprocessor.

13. The linear LED tube lamp of claim 11, wherein the voltage sensing mechanism and the control mechanism are of a non-electromagnetic relay type.

14. The linear LED tube lamp of claim 13, wherein the voltage sensing mechanism and the control mechanism are of a solid-state relay type.

15. A linear light-emitting diode (LED) tube lamp, comprising:

a housing having two ends;

a light-emitting diode printed circuit board (LED PCB), the LED PCB having LED arrays fixed thereon;

an LED driver that powers the LED arrays on the LED PCB, the LED driver having two inputs;

a voltage sensing mechanism, comprising two end voltage sensing devices and a middle voltage sensing device connected between the two end voltage sensing devices;

a control mechanism, receiving and coupling voltage outputs from the two end voltage sensing devices and the middle voltage sensing device and electrically connecting to the two inputs of the driver; and two lamp bases respectively connected to the two ends of the housing, each lamp base having a bi-pin with two pins protruding outwards, and a shock protection switch, wherein: when the shock protection switch is off, the bi-pin is not electrically connected with any one of the voltage sensing devices; when the bi-pin is inserted into a lamp socket, the shock protection switch is actuated to electrically connect the two pins of the bi-pin respectively with two inputs of one of the end voltage sensing devices, wherein each of the three voltage sensing devices comprises a coil of wire, and the control mechanism comprises three switches, each switch including two sets of electrical contacts, each set having two electrical contacts, wherein the three coils of wire and the three switches are paired to form three relays respectively;

wherein one electrical contact of each set of electrical contacts connects to one of the two inputs of the coil of wire and the other electrical contact connects to one of the inputs of the LED driver; and wherein when a predetermined threshold voltage applies on the coil of wire, the switch is actuated to electrically connect the two electrical contacts in each set of electrical contacts.

\* \* \* \* \*